March 1, 1966  H. J. BASS  3,237,665
LOCK NUTS, PROVIDED WITH PIN APERTURES ALIGNABLE
TO AN INFINITE NUMBER OF ANGULAR
LOCKING POSITIONS
Filed May 4, 1964  2 Sheets-Sheet 2
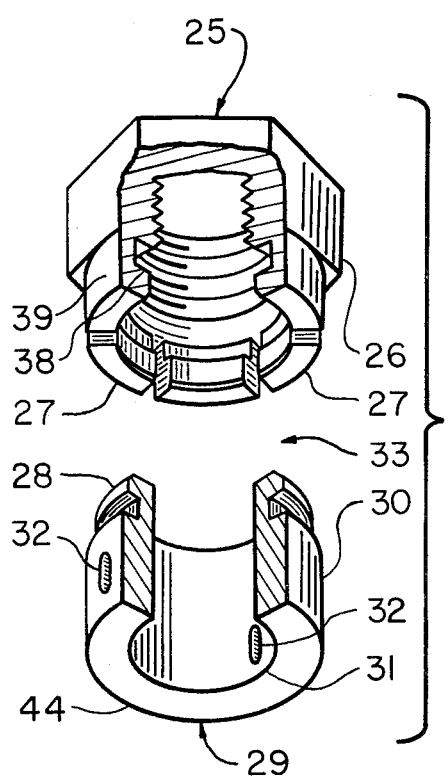
FIG. 5
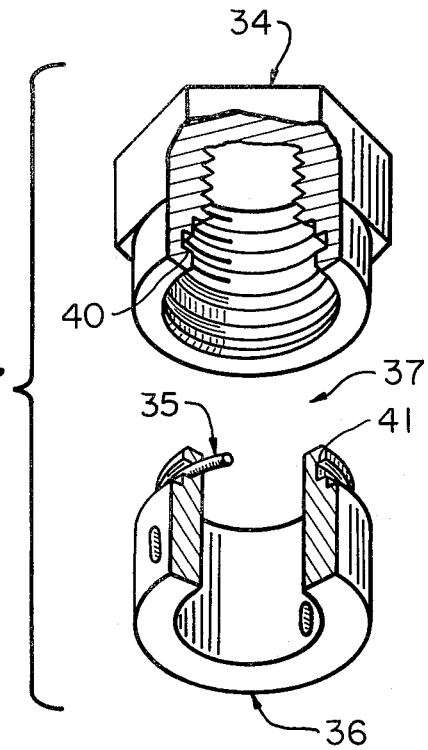
FIG. 7
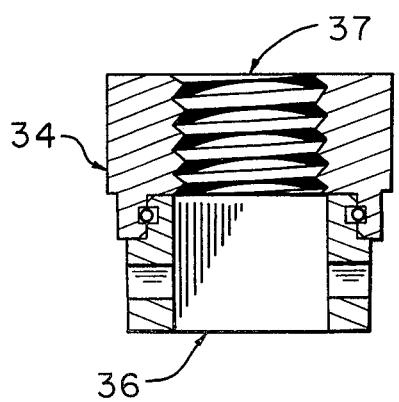
FIG. 8
FIG. 6
INVENTOR.
BY Henry James Bass United States Patent Office 3,237,665
Patented Mar. 1, 1966

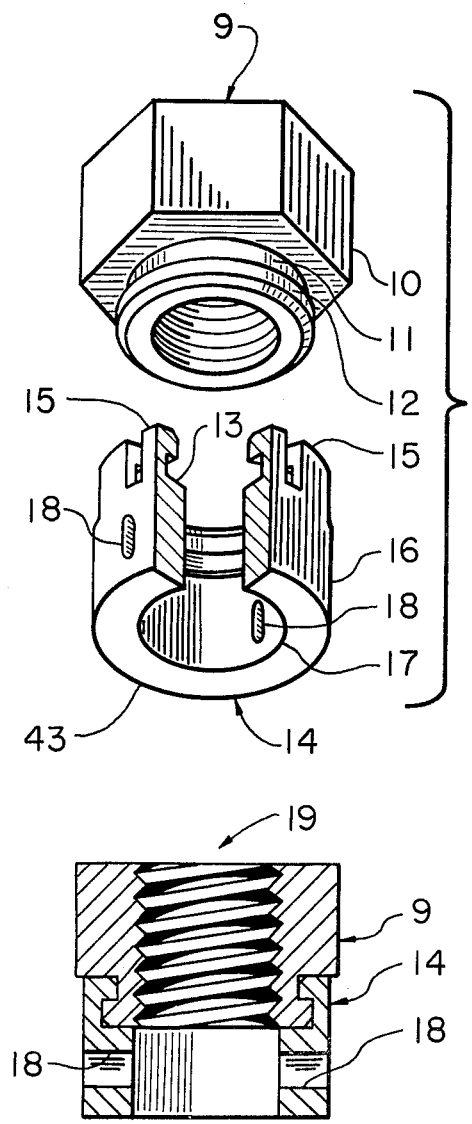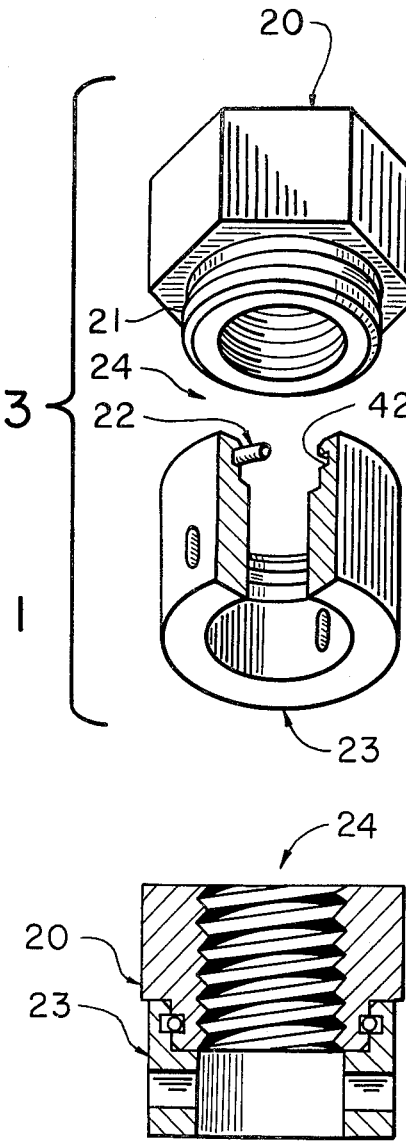

3,237,665
LOCK NUTS, PROVIDED WITH PIN APERTURES ALIGNABLE TO AN INFINITE NUMBER OF ANGULAR LOCKING POSITIONS
Henry James Bass, 360 La Perle Place, Costa Mesa, Calif.
Filed May 4, 1964, Ser. No. 365,402
4 Claims. (Cl. 151—28)

This invention relates to lock nuts which are adapted to be locked by a pin to externally threaded mating members.

This invention deals particularly with several novel means of aligning pin apertures on a lock nut for fine adjustments with pin holes in externally threaded mating members and positive locking thereof at an infinite number of angular locking positions (0–360 degrees or any fraction thereof).

An important objection inherent in existing lock nuts related to this invention is that they have a limited number of angular locking positions. For example, the conventional castellated lock nut allows only six angular locking positions. Another lock nut having a detachable locking sleeve provides up to 60 angular locking positions. Said lock nut and locking sleeve have interfitting axial grooves which require one or several complete separations and reengagements of said grooves to achieve adjustment thereof. In many instances, the thread pitch of the lock nut and its externally threaded mating member require angular locking at a setting between two locking positions available in said existing lock nuts.

This invention discloses several methods of permanently joining the integral parts of the unitary lock nut assembly construction embodied herein.

It is an object of this invention to provide several economical and quick operating lock nut assembly constructions which may be set for fine precision permanent locking at an infinite number of angular locking positions (0–360 degrees or any fraction thereof) without trial and error or the cumbersome and time consuming separation of the integral parts thereof.

Other features of this invention will readily be apparent to those skilled in the art from the following specification and related drawings.

The following drawings illustrate the invention embodied herein where like numbers refer to corresponding similar parts throughout the various figures in the drawings.

FIGURE 1 is an exploded perspective view of the annularly flanged lock nut and castellated internally grooved locking sleeve, with pin apertures, having a portion thereof removed to show the construction.

FIGURE 2 is an axial cross section through the pin apertures of the unitary lock nut assembly illustrated in FIGURE 1.

FIGURE 3 is an exploded perspective view of the externally ring-grooved lock nut and the internally ring-grooved locking sleeve, with pin apertures, having a portion thereof removed to show the construction.

FIGURE 4 is an axial cross section through the pin apertures of the unitary lock nut assembly illustrated in FIGURE 3.

FIGURE 5 is an exploded perspective view of the castellated internally grooved lock nut and the annularly flanged locking sleeve, with pin apertures, having portions removed to show the construction.

FIGURE 6 is an axial cross section through the pin apertures of the unitary lock nut assembly illustrated in FIGURE 5.

FIGURE 7 is an exploded perspective view of the internally ring-grooved lock nut and the externally ring-grooved locking sleeve, with pin apertures, having portions removed to show the construction.

FIGURE 8 is an axial cross section through the pin aperture of the unitary lock nut assembly illustrated in FIGURE 7.

Referring to FIGURE 1, the internally threaded annularly flanged lock nut 9 is provided with a hex wrenching surface 10, though a square or other multi-sided wrenching surfaces and the like may be utilized. Said lock nut 9 has an extension 11 having a beveled or radiused flange 12 which is adapted to rotate freely when permanently engaged in the internal groove 13 of the castellated locking sleeve 14. Locking sleeve 14 is provided with a plurality of beveled or radiused internally grooved flexible castellations or prongs 15 adapted for permanent interlocking engagement with said flange 12 permitting free axial rotation thereof. Said locking sleeve 14 is shown having a smooth cylindrical body 16 (though a knurled or multi-sided body may be provided) with a central opening 17 the diameter of which allows free passage of the externally threaded mating member (not shown). Said body 16 is provided with diametrically opposed pin apertures 18 (slots being shown though other apertures as square or circular openings may be provided). Also, non-closed continuous diametrically opposed slots or the like to the base 43 of locking sleeve 14 may be provided as pin apertures. Two apertures 18 are shown, however, one or more than two may be provided.

The following describes several other methods of permanently joining the lock nut 9 and the locking sleeve 14 without departing from the basic design and principle embodied in the novel means of aligning pin apertures as set forth in this invention:

The extension 11 and flange 12 portion of lock nut 9 may be slotted to form flexible castellations or prongs for a permanent interlocking free rotatable engagement within an annularly rigid non-castellated locking sleeve.

Both lock nut 9 and locking sleeve 14 may be slotted to form flexible castellations or prongs for a permanent interlocking free rotatable engagement.

Lock nut 9 and locking sleeve 14 may both be annularly rigid and non-castellated which requires, on mating, an initial force to overcome the interference fit between the flange 12 of said lock nut and the internal groove 13 of the locking sleeve 14 providing, thereafter, an interlocking free rotatable engagement.

FIGURE 2 illustrates the unitary lock nut assembly 19 comprising of the lock nut 9 and the locking sleeve 14. After lock nut 9 is screwed on the externally threaded mating member (not shown) to the desired precision setting, the locking sleeve 14 is axially rotated freely 360 degrees or any fraction thereof (without disturbing the setting of lock nut 9) until the pin apertures 18 of locking sleeve 14 are aligned with the pin hole on said member. A pin or the like (not shown) is then inserted through said aligned apertures and the ends of said pin bent peened or deposited into said apertures 18 preventing the longitudinal movement of the sleeve 14 and axial rotation of the nut 9.

Looking at FIGURE 3, the unitary lock nut assembly 24 illustrates another method of permanently joining the lock nut 20 and the locking sleeve 23 showing a similar type of construction as in FIGURE 1 without departing from the basic design and principle embodied in the novel means of aligning pin apertures as set forth in the invention. The externally ring-grooved lock nut 20 is similar to the lock nut 9 in FIGURE 1 except that the former has an external ring groove 21 adapted to permanently secure the retaining ring 22 held in the internally ring-grooved locking sleeve 23 permitting free axial rotation between nut 20 and sleeve 23. Said locking sleeve 23 is similar to the locking sleeve 14 in FIGURE 1 except that the former is rigid and non-castellated having a retaining ring 22 held in the internal ring-groove 42 thereof which is adapted to permanently secure said locking sleeve 23 and the lock nut 9 in free rotatable engagement. Said retaining ring 22 may also be adapted to be held in the external ring groove 21 of lock nut 20.

Lock nut 20 and locking sleeve 23 are shown rigid and non-castellated, however, one or the other or both may be slotted to provide flexible castellations or prongs without departing from the basic design and principle embodied in the novel means of aligning pin apertures as set forth in this invention.

FIGURE 4 illustrates the unitary lock nut assembly 24 of FIGURE 3 comprising of the lock nut 20 and the locking sleeve 23. The unitary lock nut assembly 24 is adjusted to the desired precision setting in the same manner as the unitary lock nut assembly 19 previously described in FIGURE 2.

Referring to FIGURE 5, the unitary lock nut assembly 33 illustrates another method of permanently joining the lock nut 25 and the locking sleeve 29 showing a different type of construction without departing from the basic design and principle embodied in the novel means of aligning pin apertures as set forth in this invention. The castellated internally grooved threaded lock nut 25 is provided with a hex wrenching surface 26, though a square or other multi-sided wrenching surface and the like may be utilized. Said lock nut 25 has an extension 39 having a plurality of beveled or radiused internally grooved flexible castellations or prongs 27 adapted for permanent interlocking free rotatable engagement with the flange 28 of the locking sleeve 29. The locking sleeve 29 is provided with an annular beveled or radiused flange 28 adapted to axially rotate freely when permanently retained in the internal groove 38 of lock nut 25. Said locking sleeve 29 is shown having a smooth cylindrical body 30 (though a knurled or multi-sided body may be provided) with a central opening 31 the diameter of which allows free passage of the externally threaded mating member (not shown). Said body 30 is provided with diametrically opposed pin apertures 32 (slots being shown though other apertures as a square or circular opening may be provided). Also, non-closed continuous diametrically opposed slots, or the like, to the base 44 of locking sleeve 29 may be provided as pin apertures. Two apertures 32 are shown, however, one or more than two may be provided.

The following describes several other methods of permanently joining the lock nut 25 and the locking sleeve 29 without departing from the basic design and principle embodied in the novel means of aligning pin apertures as set forth in this invention:

The extension 39 of lock nut 25 may be annularly rigid and non-castellated adapted to accept a slotted locking sleeve having flexible castellations or prongs for a permanent interlocking free rotatable engagement.

Both lock nut 25 and locking sleeve 29 may be slotted to form flexible castellations or prongs for a permanent interlocking free rotatable engagement.

Lock nut 25 and locking sleeve 29 may both be annularly rigid and non-castellated which requires, on mating, an initial force to overcome the interference fit between the flange 28 of said locking sleeve and the internal groove 38 of said lock nut providing, thereafter an interlocking free rotatable engagement.

FIGURE 6 illustrates the unitary lock nut assembly 33 of FIGURE 5 comprised of the lock nut 25 and the locking sleeve 29. Said assembly 33 is adjusted to the desired precision setting in the same manner as the unitary lock nut assembly 19 previously described in FIGURE 2.

Looking at FIGURE 7, the unitary lock nut assembly 37 illustrates another method of permanently joining the lock nut 34 and the locking sleeve 36 showing a similar type of construction as in FIGURE 5 without departing from the basic design and principle embodied in the novel means of aligning pin apertures as set forth in the invention. The internally ring-grooved lock nut 34 is similar to the lock nut 25 in FIGURE 5 except that the former is rigid and non-castellated having an internal ring-groove 40 adapted to permanently secure the retaining ring 35 which is held in the externally ring-grooved locking sleeve 36 and permits free axial rotation thereof. Said retaining ring 35 may also be adapted to be held in the internal ring groove 40 of lock nut 34. Said locking sleeve 36 is similar to the locking sleeve 29 in FIGURE 5 except that the former has thereon a retaining ring 35 held in the external ring groove 41 adapted to permanently secure said locking sleeve 36 and lock nut 34 in free rotatable engagement.

The lock nut 34 and the locking sleeve 36 are shown rigid and non-castellated, however, one or the other or both may be slotted to provide flexible castellations or prongs adapted for permanent interlocking free rotatable engagement without departing from the basic design and principle embodied in the novel means of aligning pin apertures as set forth in this invention.

FIGURE 8 illustrates the unitary lock nut assembly 37 of FIGURE 7 comprising of the lock nut 34 and locking sleeve 36. The unitary lock nut assembly 37 is adjusted to the desired precision setting in the same manner as the unitary lock nut assembly 19 previously described in FIGURE 2.

I claim:

1. A quick operating unitary lock nut assembly construction of an internally threaded lock nut which is permanently and rotatively engaged with a locking sleeve that may be set for fine precision locking at an infinite number of angular locking positions and positively locked by a pin to an externally threaded mating member, said lock nut being provided with a wrenching surface at one end thereof and an annular extension having an externally beveled annularly rigid noncastellated flange at the opposite end which is adapted to rotate freely when permanently engaged in the internal groove of said accompanying locking sleeve, said locking sleeve having an annular body with a central opening the diameter of which allows free passage of said mating member, said body having a plurality of internally beveled internally grooved flexible castellations at one end thereof adapted for permanent interlocking free rotatable engagement with said flange of said lock nut, said body having diametrically opposed pin apertures adapted to be axially rotated 360 degrees for aligning said pin apertures to a pin hole on said mating member for positive locking thereof by a pin.

2. A quick operating unitary lock nut assembly construction of an internally threaded lock nut that is permanently and rotatively engaged with a locking sleeve which may be set for fine precision locking at an infinite number of angular locking positions and positively locked by a pin to an externally threaded mating member, said lock nut having a wrenching surface at one end thereof from which protrudes an annular extension having an internally beveled internally grooved flexible castellations at the end thereof which is adapted for permanent interlocking free rotatable engagement with the flange of said accompanying locking sleeve, said locking sleeve having an annular body with a central opening the diameter of which allows free passage of said externally threaded mating member, said body having an externally beveled annularly rigid noncastellated flange at one end thereof which is adapted to rotate freely when permanently engaged into said internal groove of said lock nut, said body having diametrically opposed pin apertures adapted to be axially rotated 360 degrees for aligning said pin apertures with a pin hole on said mating member for positive locking thereof by a pin.

3. A quick operating unitary lock nut assembly construction of an internally threaded lock nut which is permanently and rotatively engaged to the retaining ring held in the accompanying locking sleeve which may be set for fine precision locking at an infinite number of angular locking positions and positively locked by a pin to an externally threaded mating member, said lock nut being provided with a wrenching surface at one end thereof from which protrudes an externally beveled extension having an external ring groove for permanently and rotatively securing said retaining ring of said locking sleeve, said locking sleeve having an annular body with a central opening the diameter of which allows free passage of said externally threaded mating member, said body having an internal ring groove at one end thereof for holding said retaining ring and allowing permanent free rotatable engagement of said lock nut and locking sleeve, said body having diametrically opposed pin apertures adapted to be axially rotated 360 degrees for aligning said pin apertures with a pin hole on said mating member for positive locking thereof by a pin.

4. A quick operating unitary lock nut assembly construction of an internally threaded lock nut which is permanently and rotatively engaged to the retaining ring held within the accompanying locking sleeve that may be set for fine precision locking at an infinite number of angular locking positions and positively locked by a pin to an externally threaded mating member, said lock nut having a wrenching surface at one end thereof from which protrudes an internally beveled extension having an internal ring groove to interlock with said retaining ring held on said locking sleeve for a permanent free rotatable engagement with said locking sleeve, said locking sleeve having an annular body with a central opening the diameter of which allows free passage of said externally threaded mating member, said body having an external ring groove at one end thereof for holding said retaining ring and allowing permanent free rotatable engagement of said lock nut and locking sleeve, said body having diametrically opposed pin apertures adapted to be axially rotated 360 degrees to align said pin apertures with a pin hole on said mating member for positive locking thereof by a pin.

References Cited by the Examiner

UNITED STATES PATENTS

| | | | |
|---|---|---|---|
| 918,367 | 4/1909 | Rancillaz | 151—2 |
| 1,200,689 | 10/1916 | Anderson | 151—29 |
| 1,516,271 | 11/1924 | Evans | 151—28 |
| 2,192,322 | 3/1940 | Mitchell | 151—37 |
| 2,365,433 | 12/1944 | Polizzi | 151—28 |
| 2,648,368 | 8/1953 | O'Connor | 151—37 |

EDWARD C. ALLEN, *Primary Examiner.*